No. 896,956. PATENTED AUG. 25, 1908.
W. F. TRAUDT.
APPARATUS FOR MIXING FLUIDS.
APPLICATION FILED OCT. 30, 1906.

UNITED STATES PATENT OFFICE.

WILLIAM F. TRAUDT, OF PASSAIC, NEW JERSEY.

APPARATUS FOR MIXING FLUIDS.

No. 896,956.   Specification of Letters Patent.   Patented Aug. 25, 1908.

Application filed October 30, 1906. Serial No. 341,336.

*To all whom it may concern:*

Be it known that I, WILLIAM F. TRAUDT, a citizen of the United States of America, and a resident of Passaic, county of Passaic, and State of New Jersey, have invented certain new and useful Improvements in Apparatus for Mixing Fluids, of which the following is a specification.

My invention relates to the mixing of fluids in general, and more specifically comprises an improved apparatus for carbonating beer or charging other liquids with suitable gases.

In the process of brewing, the beer, after being fermented and stored for clarification, is subsequently treated with kraeusen in order to supply the desired carbonic acid gas. Kraeusen is young beer in the first stage of fermentation and is added to the beer in storage where it slowly ferments and the gases of fermentation are absorbed into the beer, the process being carried on in a closed vessel under the pressure caused by the generation of the carbonic acid gas by the process of fermentation. This of course requires a second clarification of the beer and the whole process consumes from ten to twenty days time. This process is shortened in the modern practice by carbonating the beer by the direct injection into it of carbonic acid gas so that the beer is ready for the market as soon as the first clarification is sufficiently completed for racking the beer.

My invention comprises an improved apparatus for effecting this carbonization of the beer in a simple, uniform and entirely automatic manner.

The best form of apparatus embodying my invention at present known to me is illustrated in the accompanying sheet of drawings, in which:

Figure 1 is a side elevation in partial section of the apparatus, and Fig. 2 is an enlarged detail of one form of valve used in the said apparatus.

Throughout the drawings, like reference figures indicate like parts.

1 represents an ordinary beer pump or other source of liquid supply discharging into the pipe 2, which extends to the mixing chamber 3, connecting with the same through an inlet port at 4.

5 is a valve seat forming a second inlet port to the interior of said mixing chamber, to which is connected a pipe 6, controlled preferably by a check valve 7, and a reducing valve 8, and extending to a reservoir of carbonic acid gas 9, or other source of supply of fluid under pressure.

10 is a conical valve mounted in the valve seat 5, and 11 is a spreading nozzle for scattering the discharge through the valve seat 5 around the interior of the mixing chamber 3.

12 is a valve stem extending from valve 10 to the piston 13, which preferably has a series of perforations 14 formed in it. This piston is preferably mounted in a section 15 of the mixing chamber of larger diameter than the remaining portion and is interposed between the inlet ports previously referred to and the outlet port 16, which connects with the pipe 19, which forms the discharge outlet from the mixing chamber. This piston 13 may have a short piston rod 17 connected to it which is adapted to telescope into the pocket 18 formed in the head of the mixing chamber and press against the spring 27 seated therein. The tension of this spring is adjustable by turning the adjusting screw 28.

21 is a second conical valve mounted in the valve seat 20, which forms a supplemental inlet port or opening into the interior of the mixing chamber through the perforated discharge nozzle 22. This valve 21 has a stem 24 which telescopes into the sleeve 25 carried on the lower side of the valve 10 and has a limited lost motion connection therewith by virtue of the pin and slot connection 26 shown in detail in Fig. 2.

23 is a spiral spring which normally tends to hold the valve 21 down on its seat 20 until it is positively lifted therefrom by a sufficient upward travel of the valve 10.

The operation of my invention is as follows: The pump 1 being thrown into operation, forces a stream of beer or other fluid into the mixing chamber 3. The fluid passing through the perforations 14 of the piston 13 exerts a certain pressure thereon. This pressure, due to the flow of the liquid, is sufficient to partly overcome the spring 27 and move the piston 13. The connection 12 then lifts the valve 10 a graduated distance and the valve 8 being properly set, a flow of carbonic acid gas is discharged through the spreading nozzle 11 and mixes with the beer or other liquid. The greater the flow of the beer, the more the spring 27 will be compressed, the further the piston 13 will move the further valve 10 will be lifted and the wider the inlet opening afforded to the carbonic acid gas. When a further increased flow of liquid from the pump 1 occurs, the valve 10 will lift far enough to lift the slotted sleeve 25 so that the lower end of the slot will strike the pin in the pin and slot connection 26, and lift the valve 21. This will open the supplemental inlet port and cause an additional discharge of gas through the perforated nozzle 22. This second discharge will be in a line opposite to the direction of flow of the liquid and tend somewhat to retard said flow and also to produce a particularly effective admixture of gas with said liquid, such additional means for securing an effective mixture being particularly necessary where the flow of the beer is rapid. Of course when the velocity of flow of fluid from pump 1 decreases, the spring 27 will expand and first permit the closure of the valve 21 and then the continued gradual reduction of the discharge through valve seat 5, corresponding to the decreased rate of flow of the beer.

The advantages of my invention comprise its compact and simple form, the automatic regulation of the discharge of gas according to the rate of flow of the beer and the intimacy of the mixture of gas and beer produced. The forcing of the beer after charging through the numerous openings of the perforated piston 13 in itself tends to heighten the uniformity of the mixture of gas and beer.

It is evident, of course, that various changes could be made in the details of construction illustrated and described without departing from the underlying principle of my invention. Other forms of piston adapted to retard the flow of fluid and regulate the opening of the valve might be substituted for the perforated piston shown. Other forms of valve could be used and the opening and closing of said valves might be regulated by means other than that of a piston interposed across the main direction of flow of the liquid in the mixing chamber. These and other similar changes I should consider merely modifications of my invention.

Having, therefore, described my invention, I claim:

1. The combination of a mixing chamber provided with an inlet, a valve controlling said inlet, a source of supply of fluid under pressure connected to said chamber through another opening, a second source of supply of fluid under pressure connected to said valve-controlled inlet, a discharge connection from said mixing chamber and a disk shaped piston mounted in said chamber between the discharge outlet and the two inlets at a distance from the valve controlled inlet adapted to retard the flow of fluid mixture toward the outlet and connected to the valve controlling the first mentioned inlet.

2. The combination of a mixing chamber provided with an inlet, a valve controlling said inlet, a source of supply of fluid under pressure connected to said chamber through another opening, a second source of supply of fluid under pressure connected to said valve-controlled inlet, a discharge connection from said mixing chamber and a disk shaped piston mounted in said chamber between the discharge outlet and the two inlets at a distance from the valve controlled inlet adapted to retard the flow of fluid mixture toward the outlet and connected to the valve controlling the first mentioned outlet, together with a spring normally opposing the opening of said valve.

3. The combination of a mixing chamber having two inlet ports and an outlet port, a conical valve controlling one inlet port and a perforated piston mounted in the chamber in the path of flow to the outlet port connected to the conical valve, together with yielding means tending to oppose the opening of said valve, a supplemental inlet opening, a second conical valve controlling same and a lost motion connection between said piston and said second valve.

4. The combination of a mixing chamber having two inlet ports and an outlet port, a valve controlling one inlet port and a perforated piston mounted in the chamber in the path of flow to the outlet port connected to the valve, together with yielding means tending to oppose the opening of said valve, a supplemental inlet opening, a second valve controlling same and a lost motion connection between said piston and said second valve, the first valve-controlled opening discharging in the direction of flow of the fluid through the chamber and the second valve-controlled opening discharging in the opposite direction.

5. The combination of a mixing chamber having two inlet ports, a valve controlling one of said ports, an outlet port, a spreading nozzle for the valve-controlled inlet port, a perforated piston mounted in said mixing chamber between the inlet and outlet ports, and connections between said piston and the before mentioned valve, said mixing chamber having at the outlet end a section of larger diameter than that in which the inlet ports are located, and said piston being located in said enlarged section.

Signed at New York, N. Y., this 26th day of October, 1906.

WILLIAM F. TRAUDT.

Witnesses:
M. C. LOPEZ,
M. G. CRAWFORD.